United States Patent [19]

Hall

[11] 4,093,966
[45] June 6, 1978

[54] ADJUSTABLE HOLDER PARTICULARLY USEFUL FOR MOUNTING MAGNETIC HEADS

[75] Inventor: Dennis G. Hall, Wallington, England

[73] Assignee: Burroughs Corporation, Detroit, Mich.

[21] Appl. No.: 792,380

[22] Filed: Apr. 29, 1977

[51] Int. Cl.² ............................................. G11B 5/56
[52] U.S. Cl. ................................... 360/109; 360/129
[58] Field of Search ......................... 360/109, 129; 179/100.1 R; 274/4 A; 403/4

[56] References Cited

U.S. PATENT DOCUMENTS

| 3,882,543 | 5/1975 | Richards | 360/109 |
| 4,003,092 | 1/1977 | Hirata | 360/109 |

Primary Examiner—John H. Wolff
Attorney, Agent, or Firm—Benjamin J. Barish; James E. Ledbetter; Kevin R. Peterson

[57] ABSTRACT

An adjustable holder for mounting a magnetic head so that it can be adjusted for both lateral and angular deviation with respect to the center line of a recording track. The holder includes a carriage adapted to receive guide pins and a yoke carrying the magnetic head on a leg at one end. The yoke is attached to the carriage by a fastener which permits vertical and rotational displacement. The leg of the yoke includes three equally-spaced openings to receive rotational coupling elements, each of which includes a shank having an enlarged head at one end and a flange with a diametrical groove at the other end. The carriage has three fixed pins received within the grooves of respective coupling elements. The axes of the coupling elements define the corners of one equilateral triangle while the axes of the fixed pins define the corners of a similar but non-congruent equilateral triangle.

11 Claims, 10 Drawing Figures

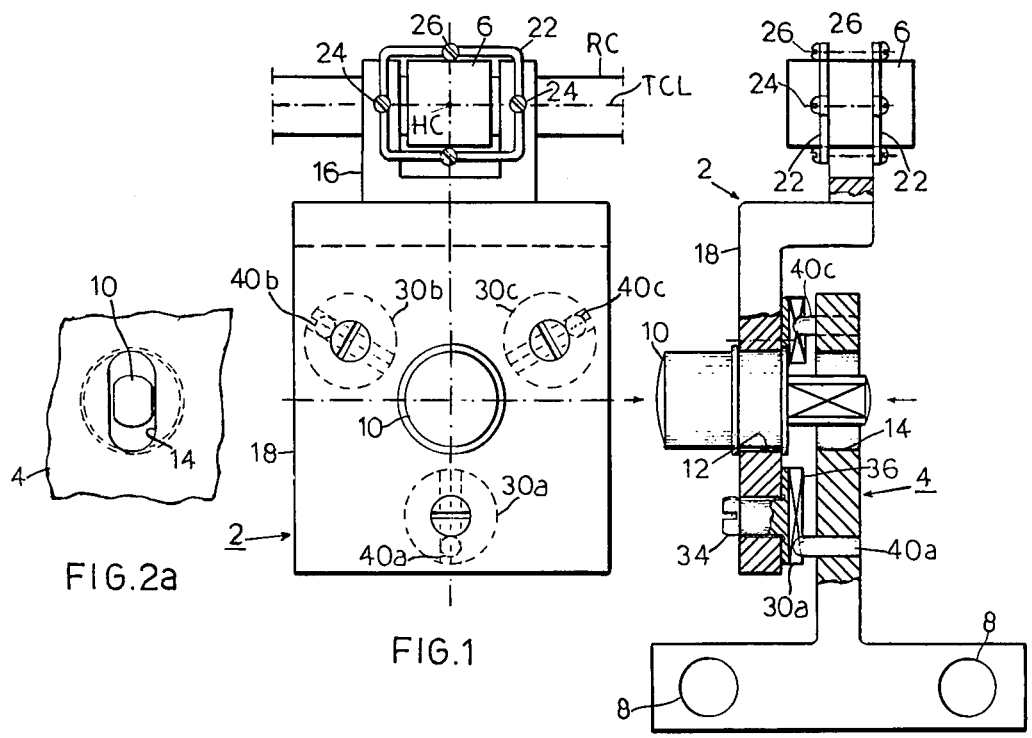
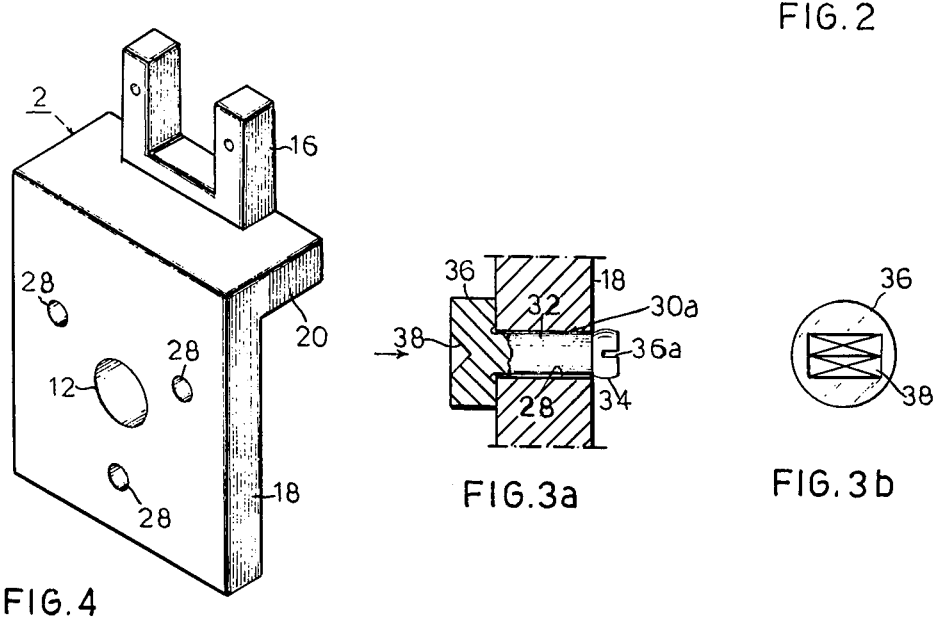

ADJUSTABLE HOLDER PARTICULARLY USEFUL FOR MOUNTING MAGNETIC HEADS

The present invention relates to an adjustable holder for a device permitting its adjustment in a plurality of directions with respect to a reference line. The invention is particularly useful for mounting magnetic heads to permit their adjustment for both centering (lateral deviation) and skew (angular deviation) with respect to the center line of a recording track, and it is therefore described below in connection with such application.

For a magnetic head to be properly adjusted with respect to the recording track, the center point of the gap in the head should be exactly aligned with the center line of the recording track (i.e., zero lateral deviation), and the gap in the magnetic head should be exactly at right angles to the recording track center line (i.e. zero skew). Many arrangements have been devised for effecting these adjustments of magnetic heads. In many of the known arrangements, however, making a lateral adjustment affects the skew, and vice versa, so that precise adjustment may require a number of manipulations and considerable skill by the operator. Other known arrangements involve complicated and expensive mounting structures and/or complicated procedures for effecting the adjustments. Further, in many of the known arrangements, removing and replacing the head or its holder requires readjustment for centering or skew.

According to the present invention, there is provided an adjustable holder for a device permitting its adjustment for centering and skew with respect to a reference line, comprising: a supporting member for supporting the device; a mounting member; attaching means attaching the supporting member to the mounting member while permitting relative displacement therebetween; each of said members including first, second, and third mutually-engaging coupling elements having axes located to define the corners of a triangle having at least two equal sides, and a center-line passing through the axis of the first coupling element and mid-way between the axes of the second and third coupling elements; and two triangles defined by the coupling element axes of the two members being similar, non-congruent triangles having common center-lines, the coupling elements of one member being fixed and the coupling elements of the other member being rotatable about their respective axes and engaging the fixed coupling elements to effect a relative displacement between the respective members; said rotatable coupling elements having means constraining the relative displacement of the engaging fixed coupling elements to rectilinear paths, with the displacement path of the first coupling elements being substantially in parallel to the common center-line of the two triangles, and the displacement paths of the second and third coupling elements being at substantially equal angles to said common center-line; whereby rotating the first rotatable coupling element effects skew adjustment of the device with respect to the reference line, and rotating the second and third rotatable coupling elements in equal and opposite directions effects centering adjustment of the device with respect to the reference line.

In the preferred embodiment of the invention described below, the axes of the three coupling elements of the two members define the corners of two equilateral triangles having concentric pitch circles of unequal diameters, the center-point of the device to be adjusted with respect to the reference line being substantially on the pitch circle diametral line drawn through the axis of the first coupling element on said supporting member.

According to a more specific aspect of the invention, there is provided an adjustable holder for a device permitting its adjustment for centering and skew with respect to a reference line, comprising: a supporting member for supporting the device; a mounting member; attaching means attaching the supporting member to the mounting member while permitting relative displacement therebetween; each of said members including first, second and third mutually-engaging coupling elements having axes located to define the corners of an equilateral triangle, the triangles of the coupling elements of the two members being on concentric pitch circles of unequal diameters; the coupling elements of one member being fixed, and the coupling elements of the other member being rotatable about their respective axes and engaging the fixed coupling elements to effect a relative displacement between the respective members; the center-point of the device to be adjusted with respect to the reference line being on the pitch circle diametral line drawn through the axis of the first coupling element on said supporting member; said rotatable coupling elements having means constraining the relative displacement of the engaging fixed coupling elements to rectilinear paths with the displacement path of the first coupling elements being substantially parallel to the center-line of the pitch circle of the fixed coupling elements, and the displacement paths of the second and third coupling elements being substantially at right angles to lines drawn from the axes of the second and third fixed coupling elements tangent to their respective pitch circle; whereby rotating the first rotatable coupling element effects skew adjustment of the device with respect to the reference line, and rotating the second and third rotatable coupling elements in equal and opposite directions effects centering adjustment of the device with respect to the reference line.

Preferably, the center point of the device to be adjusted is substantially at the intersection point of said lines drawn through the axes of the second and third fixed coupling elements tangent to their respective pitch circle. In such an arrangement, skew adjustments may be effected without changing lateral positioning, and vice versa. Also, the removal of the head supporting member, e.g., for replacement of the head, does not require re-adjustment for centering or skew.

In the preferred embodiment of the invention described below, the rotatable coupling elements are carried by the supporting member, and the fixed coupling elements are carried by the mounting member.

The invention is described below particularly for use in mounting magnetic heads to permit lateral and skew adjustment with respect to the center line of the recording track.

Further features and advantages of the invention will be apparent from the description below.

The invention is herein described, by way of example only, with reference to the accompanying drawings, wherein:

FIG. 1 is a front elevational view of an adjustable magnetic head mounting constructed in accordance with the invention;

FIG. 2 is a side elevational view of the adjustable mounting of FIG. 1, and FIG. 2a is a fragmentary view from the opposite side thereof;

FIGS. 3a and 3b are transverse sectional and front plan views, respectively, illustrating one of the rotatable coupling elements in the adjustable mounting of FIGS. 1 and 2;

FIG. 4 is a three-dimensional view illustrating the carriage in the adjustable mounting of FIGS. 1 and 2;

Figure 6A:
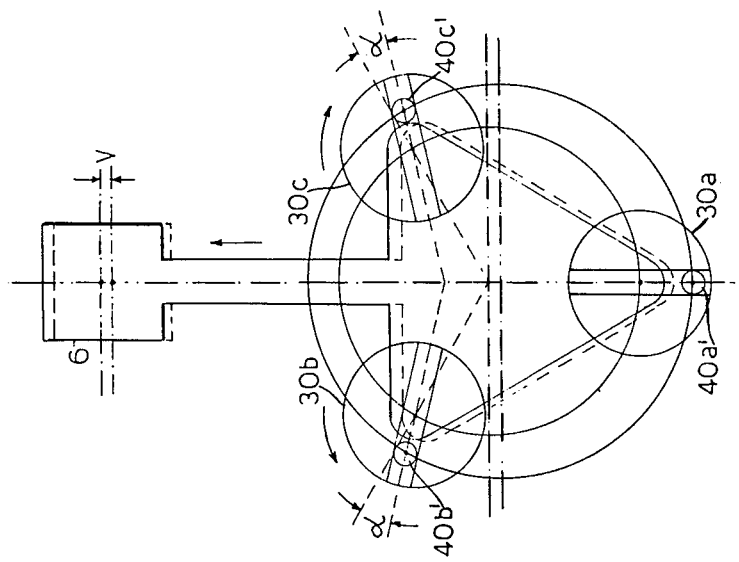
FIG. 6a illustrates a centering error (i.e., a non-zero lateral deviation) of the magnetic head with respect to the track, and the manner of correcting same.

The adjustable holder or mounting illustrated in the drawings comprises two main members, namely a supporting member generally designated 2, and a mounting member generally designated 4. Supporting member 2 is in the form of a yoke carrying the magnetic head 6 at one end, and mounting member 4 serves as a carriage having a pair of openings 8 adapted to receive guide pins (not shown) for guiding the movement of the carriage, as in a known arrangement. The supporting yoke 2 is attached to the mounting carriage 4 by means of a fastener 10 having a shank passing through an opening 12 formed in the yoke 2, and another opening 14 formed in the carriage 4. Opening 12 is of the same diameter as the shank of fastener 10, and opening 14 is in the form of a large hole or slot elongated in the vertical direction. Fastener 10 thus permits yoke 2 to be displaced both vertically and rotationally with respect to carriage 4, and with respect to the center line TCL of a recording track RC.

Yoke 2 includes a pair of parallel, offset legs 16, 18 (FIG. 4) joined by an intermediate bridge 20. Leg 16 provides a resilient support for the magnetic head 6. For this purpose, leg 16 is bifurcated into a pair of spaced sections, and a pair of closed-loop springs 22 are secured to the two sections by a pair of fasteners 24, the magnetic head 6 being secured to springs 22 by a further pair of fasteners 26 so as to be resiliently disposed in the space between the two sections of leg 16. Leg 18 of the yoke includes, in addition to opening 12 for receiving the shank of fastener 10, three further openings 28 equally-spaced from each other around opening 12 and adapted to receive rotational coupling elements, generally designated 30a, 30b and 30c in FIG. 1.

The structure of the rotational coupling elements is best seen in FIGS. 3a and 3b illustrating one coupling element, 30a, for purposes of example. Thus, it includes a shank 32 received within its respective opening 28 in yoke leg 18, one end of shank 32 (the end facing away from carriage 4) being formed with a slightly enlarged head 34 having a screwdriver slot 36a to facilitate rotating the coupling element. The opposite end of shank 32 (the end facing carriage 4) terminates in an enlarged flange or seat 36 formed with a diametral V-groove 38.

Carriage 4 carries three fixed coupling elements in the form of pins or pegs 40a, 40b, 40c having rounded free tips received within grooves 38 of the rotatable coupling elements 30a, 30b, 30c carried by yoke 2. Pins 40a, 40b, 40c may merely be force-fitted into openings formed in carriage 4. These pins are also equally-spaced from each other, but their spacing from the longitudinal axis of the fastener shank 10 is greater than that of the rotatable coupling elements 30a, 30b, 30c carried by yoke 2.

Figure 5:
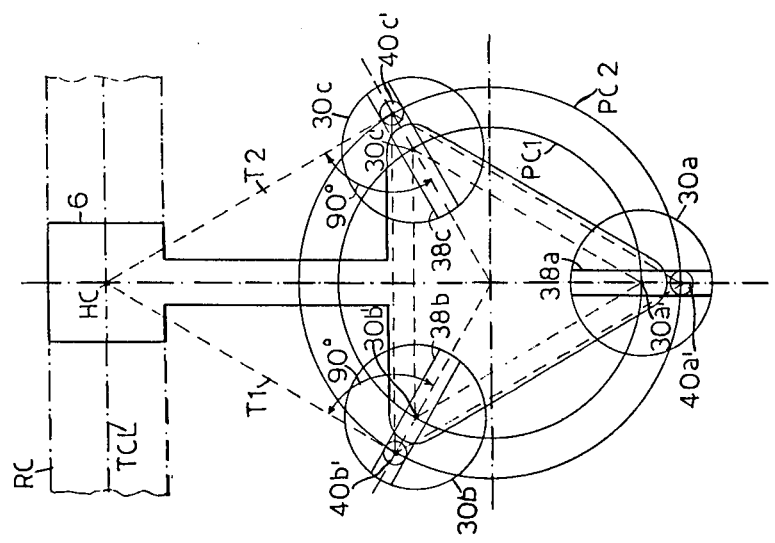
FIG. 5 is a diagrammatic view illustrating the correct positioning of the main elements of the mounting of FIGS. 1 and 2 with respect to the magnetic record track.

It will thus be seen, particularly from FIG. 5, that the axes 30a', 30b', 30c' of the rotatable coupling elements 30a, 30b, 30c, carried by yoke 2, define the corners of an equilateral triangle, and lie at equally spaced points on the circumference of a pitch circle PC1. In addition, the axes 40a', 40b', 40c' of the fixed coupling elements 40a, 40b, 40c carried on carriage 4, also define the corners of a similar, but non-congruent equilateral triangle, and lie on the circumference of a second pitch circle PC2 (FIG. 5); pitch circle PC2 is concentric to, but has a greater diameter than, pitch circle PC1. As further shown in FIG. 5, the V-groove 38a of rotatable coupling element 30a is aligned with the center point HC of the magnetic head 6; and the grooves 38b and 38c of coupling elements 30b and 30c are substantially at right angles to the tangent lines T1, T2 tangent to pitch circle PC2 and passing through the axes 40b', 40c' of the fixed coupling elements 40b, 40c. Preferably, the arrangement is such that tangent lines T1, T2 intersect each other at the center point HC of the magnetic head 6, but this is not essential as will be explained below.

The magnetic head 6 may be adjusted for both centering (lateral deviation from the track center line TCL) and for skew (angular deviation from the track center line) in the following manner:

First, the magnetic head 6 is adjusted for centering by rotating coupling elements 30b and 30c equal amounts in opposite directions. Thus, as shown in FIG. 6a, if element 30b is rotated (e.g., by means of a screwdriver received within its slot 36a) through an angle "α" in the counter-clockwise direction, and element 30c is rotated clockwise through the same angle "α", yoke 2 will move upwardly in the vertical direction displacing the center line HC of the magnetic head 6 by the distance "V", this movement of the yoke and magnetic head being constrained to this rectilinear path by pin 40a moving within groove 38a of coupling element 30a. The centering adjustment is thus effected in the above manner without affecting the skew of the head.

Now, the skew adjustment may be effected by rotating coupling element 30a. This may be done under either one of two different conditions illustrated in FIGS. 6b and 6c, respectively.

Figure 6C:
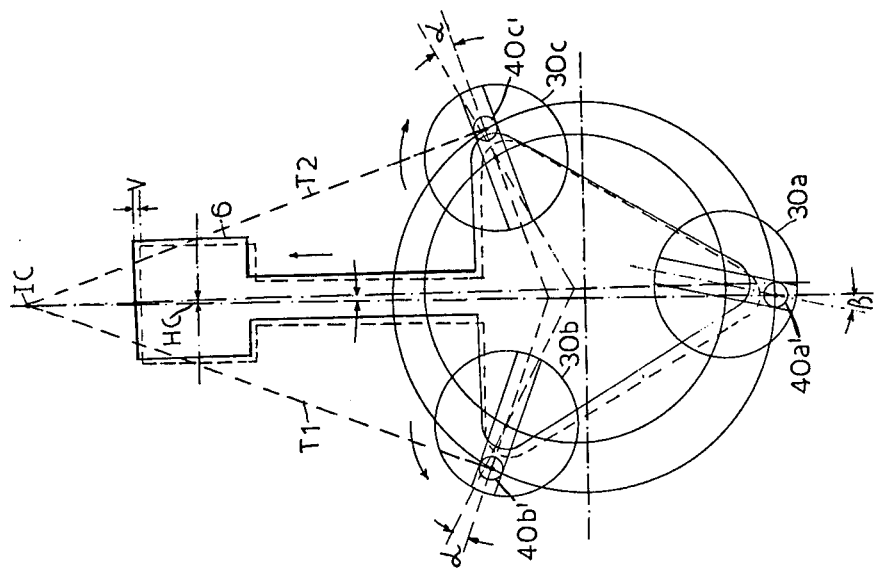
FIGS. 6b and 6c each illustrate a skew error (i.e., a non-zero angular deviation) of the magnetic head with respect to the recording track, and the manner for correcting same.
Figure 6B:
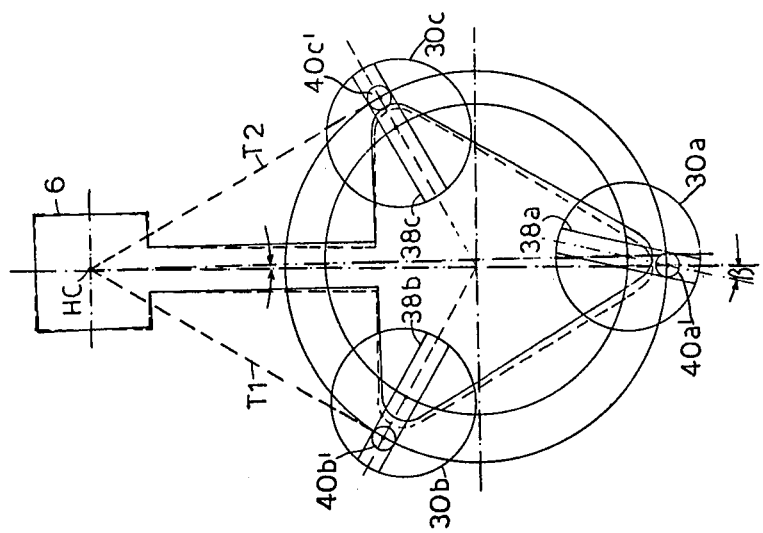

Thus, FIG. 6b illustrates the preferred condition wherein the intersecting tangent lines T1, T2, passing through the axes of the fixed pins 40b, 40c, intersect each other at the center HC of the magnetic head 6. Under such a condition, rotating element 30a by an angle "β" causes yoke 2, and the magnetic head 6 carried thereby, to be rotated about the center point HC of the magnetic head. It will be seen that there will be only angular, and no lateral, displacement of the magnetic head, and therefore skew adjustment is effected without affecting centering.

FIG. 6c illustrates the condition wherein the tangent lines T1, T2, passing through the axes of the fixed pins 40b, 40c, do not intersect each other at the center point HC of the magnetic head 6, but intersect each other at a point IC which is vertically displaced from the center point HC of the magnetic head. In such a case, the yoke 2 and the magnetic head 6 will rotate about the tangent intersecting point IC, and since this is not the same point as the center point HC of the magnetic head, there will be some lateral displacement of the head. However, this will be very small, inconsequential in most cases. Accordingly, even in the arrangement illustrated in FIG.

6c wherein the tangent lines T1, T2 do not intersect at the center point HC of the magnetic head, the skew adjustment may in most cases be effected without significantly affecting head centering. In those cases where centering is significantly affected, this may be corrected by again adjusting for centering as described above.

A further advantage present in the arrangement illustrated is that the yoke 2, together with the magnetic head 6, may be readily removed and replaced without the need for subsequently readjusting for centering and skew.

Many variations will be apparent. For example, the fixed coupling elements may be on the yoke 2, and the rotatable coupling elements may be on the carriage 4. Also, instead of providing the groove and pin coupling between the yoke 2 and carriage 4, there may also be used a pin and slot arrangement constraining the displacement of the engaging coupling elements to the mentioned rectilinear paths.

Many other variations, modifications and applications of the illustrated embodiment will be apparent.

What I claim as new and desire to secure by Letters Patent of the United States is:

1. An adjustable holder for a device permitting its adjustment for centering and skew with respect to a reference line, comprising: a supporting member for supporting the device; a mounting member; attaching means attaching the supporting member to the mounting member while permitting relative displacement therebetween; both said supporting member and said mounting member including first, second, and third mutually-engaging coupling elements having axes located to define the corners of a triangle having at least two equal sides, and a centerline passing through the axis of the first coupling element and mid-way between the axes of the second and third coupling elements; the two triangles defined by the coupling element axes of said supporting member and said mounting member being similar, non-congruent triangles having common center-lines; the coupling elements of one member being fixed and the coupling elements of the other member being rotatable about their respective axes and engaging the fixed coupling elements to effect a relative displacement between said supporting member and said mounting member; said rotatable coupling elements having means constraining the relative displacement of the engaging fixed coupling elements to rectilinear paths, with the displacement path of the first coupling elements being substantially parallel to the common center-line of the two triangles, and the displacement paths of the second and third coupling elements being at substantially equal angles to said common center-lines; said second and third mutually-engaging coupling elements being positioned between said first mutually-engaging coupling element and the device to be adjusted; whereby rotating the first rotatable coupling element effects skew adjustment of the device with respect to the reference line, and rotating the second and third rotatable coupling elements in equal and opposite directions effects centering adjustment of the device with respect to the reference line.

2. A holder according to claim 1, wherein the axes of the coupling elements of the two members define the corners of two equilateral triangles having concentric pitch circles of unequal diameters, the center-point of the device to be adjusted with respect to the reference line being substantially on the pitch circle diametral line drawn through the axis of the first coupling element on said supporting member.

3. A holder according to claim 2, wherein the diameter of the pitch circle of the fixed coupling elements is larger than that of the rotatable coupling elements.

4. A holder according to claim 1, wherein one end of each rotatable coupling element includes an enlarged head formed with diametral groove, each fixed coupling element including a pin displaceable within the groove of its respective rotatable coupling element for constraining the relative displacement of the engaging fixed and rotatable coupling elements to said rectilinear paths.

5. A device according to claim 4, wherein each rotatable coupling element further includes a slotted head at its opposite end facilitating the manual rotation thereof.

6. A holder according to claim 1 wherein the rotatable coupling elements are carried by the supporting member, and the fixed coupling elements are carried by the mounting member.

7. A holder according to claim 1 wherein said attaching means includes a fastener having a shank passing through an opening of the same diameter as the shank in the supporting member, and through an elongated opening in the mounting member.

8. A holder according to claim 1 in combination with a magnetic head supported by the supporting member.

9. An adjustable holder for a device permitting its adjustment for centering and skew with respect to a reference line, comprising: a supporting member for supporting the device; a mounting member; attaching means attaching the supporting member to the mounting member while permitting relative displacement therebetween; both said supporting member and said mounting member including first, second and third mutually-engaging coupling elements having axes located to define the corners of an equilateral triangle, the triangles of the coupling elements of said supporting member and said mounting member being on concentric pitch circles of unequal diameters; the coupling elements of one member being fixed, and the coupling elements of the other member being rotatable about their respective axes and engaging the fixed coupling elements to effect a relative displacement between said supporting member and said mounting member; the center-point of the device to be adjusted with respect to the reference line being on the pitch circle diametral line drawn through the axis of the first coupling element on said supporting member; said rotatable coupling elements having means constraining the relative displacement of the engaging fixed coupling elements to rectilinear paths with the displacement path of the first coupling elements being substantially parallel to the center-line of the pitch circle of the fixed coupling elements and the displacement paths of the second and third coupling elements being substantially at right angles to lines drawn from the axes of the second and third fixed coupling elements tangent to their respective pitch circle; said second and third mutually-engaging coupling elements being positioned between said first mutually-engaging coupling element and the device to be adjusted; whereby rotating the first rotatable coupling element effects skew adjustment of the device with respect to the reference line, and rotating the second and third rotatable coupling elements in equal and opposite directions effects centering adjustment of the device with respect to the reference line.

10. A holder according to claim 9, wherein the center-point of the device to be adjusted with respect to the reference line is substantially on the pitch circle diametral line drawn through the axis of the first fixed coupling element.

11. A holder according to claim 10, wherein the center-point of the device to be adjusted is substantially at the intersection point of said lines drawn through the axes of the second and third fixed coupling elements tangent to their respective pitch circle.

* * * * *